(12) United States Patent
Chiang et al.

(10) Patent No.: US 10,124,327 B2
(45) Date of Patent: Nov. 13, 2018

(54) NANO-COMPOSITE AND METHOD OF PRODUCING THE SAME

(71) Applicant: National Taiwan University of Science and Technology, Taipei (TW)

(72) Inventors: Wei-Hung Chiang, Taipei (TW); Huin-Ning Huang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 369 days.

(21) Appl. No.: 14/936,745

(22) Filed: Nov. 10, 2015

(65) Prior Publication Data
US 2016/0361714 A1  Dec. 15, 2016

(30) Foreign Application Priority Data

Jun. 10, 2015  (TW) .............................. 104118695 A

(51) Int. Cl.
| | |
|---|---|
| *B22F 9/24* | (2006.01) |
| *B01J 37/34* | (2006.01) |
| *B82Y 30/00* | (2011.01) |
| *B82Y 40/00* | (2011.01) |
| *B01J 21/18* | (2006.01) |
| *B01J 23/42* | (2006.01) |
| *B01J 23/46* | (2006.01) |
| *B01J 23/50* | (2006.01) |
| *B01J 23/52* | (2006.01) |
| *B01J 23/72* | (2006.01) |
| *B01J 23/745* | (2006.01) |
| *B01J 35/00* | (2006.01) |
| *H01B 1/02* | (2006.01) |

(52) U.S. Cl.
CPC ............. *B01J 37/349* (2013.01); *B01J 21/18* (2013.01); *B01J 23/42* (2013.01); *B01J 23/468* (2013.01); *B01J 23/50* (2013.01); *B01J 23/52* (2013.01); *B01J 23/72* (2013.01); *B01J 23/745* (2013.01); *B01J 35/0006* (2013.01); *B01J 35/0013* (2013.01); *H01B 1/02* (2013.01); *H01B 1/026* (2013.01); *B82Y 30/00* (2013.01); *B82Y 40/00* (2013.01); *Y10S 977/734* (2013.01); *Y10S 977/773* (2013.01); *Y10S 977/847* (2013.01); *Y10S 977/892* (2013.01); *Y10S 977/932* (2013.01)

(58) Field of Classification Search
None
See application file for complete search history.

(56) References Cited

U.S. PATENT DOCUMENTS

| | | | | |
|---|---|---|---|---|
| 7,438,885 | B1* | 10/2008 | Seal ........................ | B82Y 30/00 423/447.1 |
| 2011/0274913 | A1* | 11/2011 | Lin ........................ | B05D 1/00 428/323 |
| 2013/0108840 | A1* | 5/2013 | Ivanov ..................... | H01B 1/24 428/195.1 |

* cited by examiner

*Primary Examiner* — George Wyszomierski
(74) *Attorney, Agent, or Firm* — Alan D. Kamrath; Kamrath IP Lawfirm, P.A.

(57) ABSTRACT

A method of producing nano-composites has the following steps: providing a solution, with the solution having a substrate and a precursor of a zero-dimensional nanoparticles; and subjecting a surface of the solution to a plasma to activate the precursor to generate the zero-dimensional nanoparticles in the solution. The nanoparticles are self-assembled on the substrate uniformly to generate the nano-composites.

4 Claims, 13 Drawing Sheets

NANO-COMPOSITE AND METHOD OF PRODUCING THE SAME

BACKGROUND OF THE INVENTION

1. Field of the Invention

The present invention relates to a method for producing a nano-composite and, particularly, to a method for manufacturing self-assembling a nano-composite by plasma.

2. Description of the Prior Art

Nanoparticles, such as precious metal gold (Au), silver (Ag), and platinum (Pt) nanoparticles, have been widely used generally in chemical reactions as catalysts. Germanium (Ge) applied with nano technology is greatly used in the semiconductor industry. Iron (Fe), cobalt (Co), nickel (Ni) and other transition metal nanoparticles were overwhelmingly applied to military, civilian or electronic industries. Due to the high specific surface area or enhanced mechanical, modified physical and chemical properties of the metal nanoparticles, the development of nanometer-grade metal materials continuously acquires public attention.

Conventional preparation of nanoparticles is mainly performed by a wet chemical method. This kind of method has an advantage on the production yield. However, for the present preparation method, the reaction time required for preparation is too long (typically several hours are required), the size of nanoparticles is not even, excessive agglomeration of nanoparticles occurs or the additional purification steps to obtain the nanoparticles are too cumbersome, and the used surfactant or chemicals result in environmental pollution. Accordingly, the above problems significantly limit the development of nanoparticles.

In order to render nanometer-grade materials multiple-functional, research has been attempted to take advantage of the semiconductor manufacturing process to generate a nano-composite structure. However, the manufacturing process yields little nano-composites and is completely not feasible or beneficial to vast production, which results in a great hindrance in its industrial application.

SUMMARY OF THE INVENTION

In order to change the above-mentioned shortcomings of manufacture of nanoparticles and to solve the problems of methods for producing nano-composites yielding less and lacking of industrial use, the present invention provides a method of producing nanoparticles with a uniform particle size by utilizing a plasma process, which allows the nanoparticles to be directly absorbed on a pre-selected substrate, so that nanoparticles can self-assemble on the pre-selected substrate. Since the substrate is a selected nanometer grade, a resultant different dimensional nano-composite is thus quickly and conveniently generated.

The present invention provides a method for producing a nano-composite, comprising the steps of:

providing a reaction solution containing at least one dimensional nanomaterials and a precursor of zero-dimensional nanoparticles; and applying plasma to a surface of the reaction solution or in the reaction solution to generate the zero-dimensional nanoparticles from the precursor of the zero-dimensional nanoparticles to assemble on the at least one dimensional nanomaterials to obtain a nano-composite dispersed in the reaction solution.

The present invention also provides a diverse multiple-dimensional nano-composite, which is formed by binding the zero-dimensional nanoparticles to the surface of the at least one dimensional nanomaterials, which is due to the electrical potential difference, different charge, surface characteristics or attraction between molecules.

In this way, the present invention includes the following features to achieve the following technical effects:

1. the present invention provides a method for directly producing a large amount of nanoparticles with an even dispersion through the adjustment of formulation to generate nanoparticles directly synthesized or attached on a surface of a selected substrate, with nanoparticles being uniformly attached to the surface of the substrate, which results in an advanced method of producing a self-assembled nano-composite having a diverse multiple-dimensional structure to solve the problem in industrial production of nanoparticles, and more to solve the problem in redundant procedures for dispersion of nanoparticles or nano-composites;

2. the present invention provides a solution for resolving the need of nanomaterials for different purposes, by choosing desired nanoparticles and substrates to obtain various diverse multiple-dimensional nano-composites, which result from precise choice of materials to grow to conquer the barrier of current techniques to provide a more diverse, less restrictive, more simple and efficient method for producing the same;

3. the present invention utilizes a plasma manufacturing process to increase the absorption effect between the metal nanoparticles and the substrate, which is completely different from the existing particle/substrate synthesis;

4. in the aspect of applications, the present invention provides a substance comprising metal nanoparticles with an enhanced Raman spectroscopy, which makes it ideally suitable for an enhanced surface Raman spectroscopy (SERS) effect for use in related applications, with the resulting nano-composite, compared to pure nanoparticles, more obviously and hugely increasing the effect than that of the prior art;

5. the present invention utilizes a plasma process to disperse large amounts of metal particles uniformly in the solution or on the surface of the substrate, and when proven by the analysis of the effect on the present invention, the present invention is better than existing materials when applied to the surface enhanced Raman spectroscopy;

6. the present invention can be effectively applied to the material characteristics detection, biomedical industry, food safety and environmental pollution monitoring and prevention, and other purposes; and 7. the present invention provides nanoparticles without adding additional surfactant to achieve uniform dispersion of nanoparticles, which solves the problems in the art that require using an organic solvent, to rendering the process environmentally friendly.

DETAILED DESCRIPTION OF THE PREFERRED EMBODIMENTS

Figure 1:
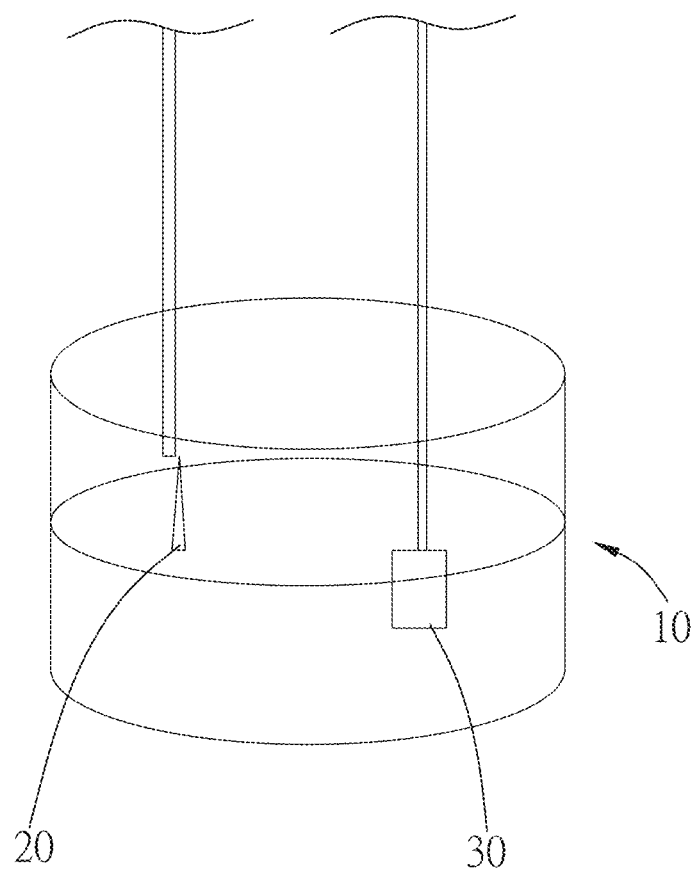
FIG. 1 is an illustrative diagram of a preferred embodiment of the reaction apparatus according to the present invention.

Referring to FIG. 1, the present invention provides a method for producing a diverse multiple-dimensional nanocomposite, which takes advantage of a reaction apparatus 10 and a plasma generating device 20. The reaction apparatus 10 receives a reaction liquid, with the reaction liquid comprising at least one precursor of a zero-dimensional nanoparticle, and where the precursor may be molecular or ionic nanoparticles. The plasma generating device 20 generates plasma onto the surface of the reaction liquid or into the reaction liquid, and the precursor is reduced or compounded by the plasma in the reaction liquid to disperse the zero-dimensional nanoparticles uniformly in the reaction liquid. The reaction liquid could contain a substrate, which is at least one dimensional nanomaterial, and the substrate could be uniformly dispersed or suspended in the reaction liquid, such that the nanoparticles are reduced or generated to attach immediately to the substrate. The nanoparticles are self-assembled to form diverse multiple-dimensional nano-composites. The at least one dimensional nanomaterials includes nanotubes, nanowires, nanoribbon, nanosheet, nanospheres or nanopolyhedron. The at least one dimensional nanomaterials could be a sub-micron or other magnitude. As the aforementioned process, the zero-dimensional nanoparticles are self-assembled and are uniformly dispersed on the surface of the at least one dimensional nanomaterials.

Mainly due to the use of the plasma, the reaction liquid is allowed to generate the zero-dimensional nanoparticles, which are uniformly dispersed into the reaction liquid. The reaction liquid contains an amount of charges or charged particles, or, because of the molecular attraction between the particles, the zero-dimensional nanoparticles do not aggregate and cumulate, but are uniformly dispersed on the surface of the substrate.

The above plasma generating device 20 includes an atmospheric pressure plasma source or an atmospheric pressure microplasma source. The plasma could be generated by Argon or other gases under one atmospheric pressure or under a pressure close to atmospheric pressure to produce the plasma. In the present embodiment, after the plasma was generated at an atmospheric pressure and in contact with the reaction liquid, high-energy particles carried by plasma strike the surface of the liquid to form a hydrated electron. The zero-dimensional nanoparticles in the reaction liquid self-assemble on the substrate by hydrated electrons reduction. The zero-dimensional nanoparticles uniformly disperse in the reaction liquid due to the large amount of charge or charged particles, and no aggregation occurs.

Further, the present invention has an electron receiving unit 30 deposited in the reaction liquid, for receiving released electrons from the plasma generating device 20, and providing a continuous ion for synthesis of metal nanoparticles. For example, when gold nanoparticles are desired, the electron receiving unit 30 could be made of gold to form a continuous reaction environment. The electron receiving unit 30 provides an ionic form of desired gold nanoparticles in the reaction liquid. The ionic form of desired gold nanoparticles are reduced to form the desired gold nanoparticles.

Further referring to Table 1, in the present invention, the preferred embodiment of the reaction liquid is prepared with a precursor of the desired metal nanoparticles, or a precursor of the desired metal nanoparticles and substrate. The precursor of the desired metal nanoparticles is preferably a salt of metal, which is dissolved in a solvent to dissociate into a metal ion, such as a silver ion, a gold ion, a copper ion, and the like.

The substrate may be a two-dimensional nanomaterial or a three-dimensional nanomaterial, which include but is not limited to graphene, functionalized graphene, molybdenum disulfide ($MoS_2$), graphene nanoribbon (GNR) or carbon nanotube (CNT) uniformly distributed in the reaction liquid. The generated nanoparticles are absorbed or adhered to at least a portion of the surface of the substrate.

TABLE 1

| | |
|---|---|
| Metal for synthesized of | silver (Ag), gold (Au), copper (Cu), platinum (Pt), iridium (Ir), ferrum (Fe) |
| Precursor thereof | silver nitrate, Chloroauric Acid, Copper(II) Sulfate, Dihydrogen hexachloroplatinate (IV) hexahydrate, Iridium(III) chloride trihydrate, iron(III) oxide |
| Substrate thereof | graphene, $MoS_2$, graphene nanoribbon (GNT), carbon nano tube (CNT) |

The reaction liquid may further add polysaccharides or other polymers to prevent agglomeration of the nanoparticles. The polysaccharides may be but are not limited to fructose or glucose. The polymers may be, for example, polyvinylpyrrolidone (PVP) or trisodium citrate (TSC). The polyvinylpyrrolidone (PVP) and the trisodium citrate have a slight reduction effect, thus to enhance reduction of the nanoparticles.

When depositing the electron receiving unit 30, the substrate could be only uniformly dispersed in the reaction liquid, and the precursor may not be necessary during using the electron receiving unit 30. Only when the plasma is applied to the reaction liquid, the electron receiving unit 30 continues to provide an ion for synthesis of nanoparticles in the reaction liquid. Desired nanoparticles are synthesized by reduction, and they self-assemble on and attach to the local surface of the substrate.

Figure 2:
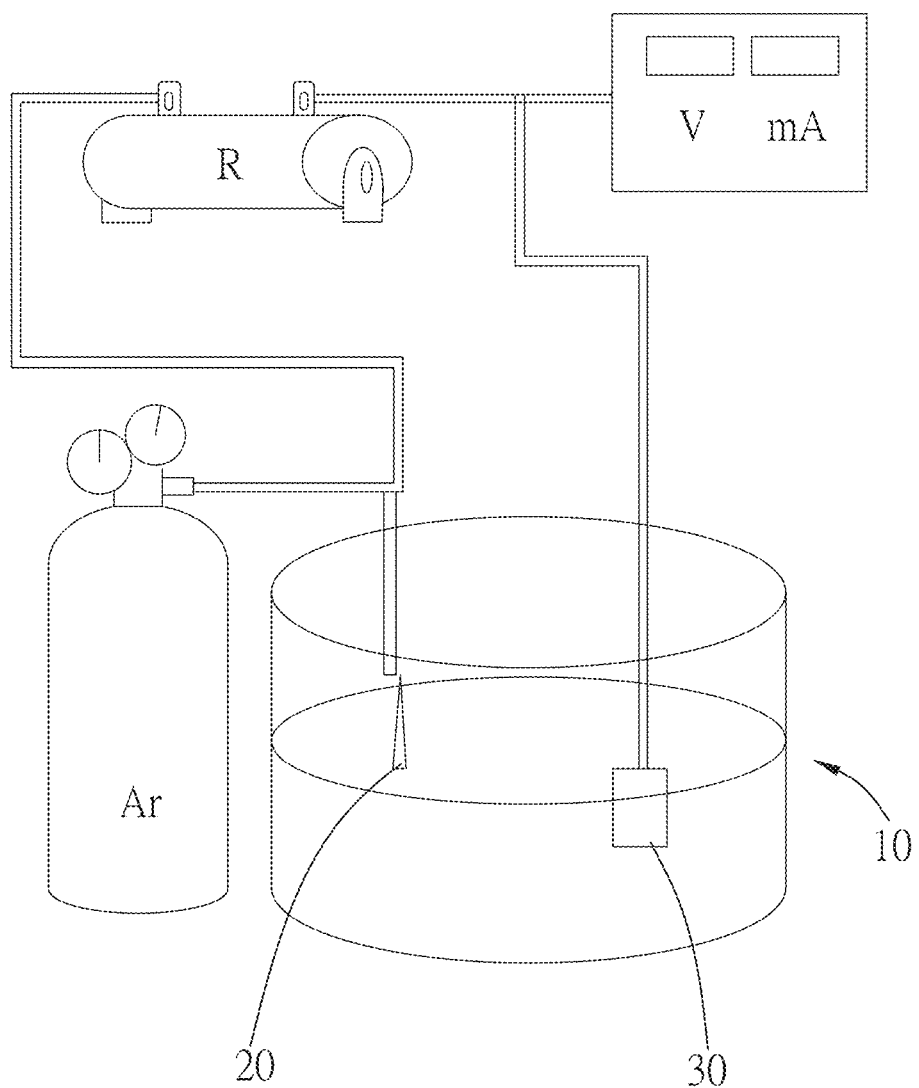
FIG. 2 illustrates the first preferred embodiment of the reaction apparatus of the present invention.

Referring to FIG. 2, the plasma generating device 20 could produce plasma through the use of a high-voltage high-power resistor or a voltage stabilizing circuit to stably introduce the current (high voltage and low current (mA)),

Example 1

The first preferred embodiment of the present invention is the manufacture of silver nanoparticles. The reaction apparatus 10 contains a reaction liquid containing a solution of silver nitrate at a concentration ranging from about 1 mM to 0.01 M, graphene and fructose.

The plasma generating device 20 applied a plasma to the reaction liquid. The plasma with high-energy particles strikes the surface of the reaction liquid and produces hydrated electrons to obtain silver nanoparticles by reduction. The equation of the reaction in the reaction liquid was as follows:

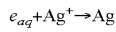

$e_{aq}^- + Ag^+ \rightarrow Ag$

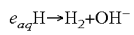

$e_{aq}^- H \rightarrow H_2 + OH^-$

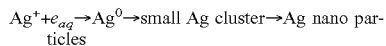

Figure 3:
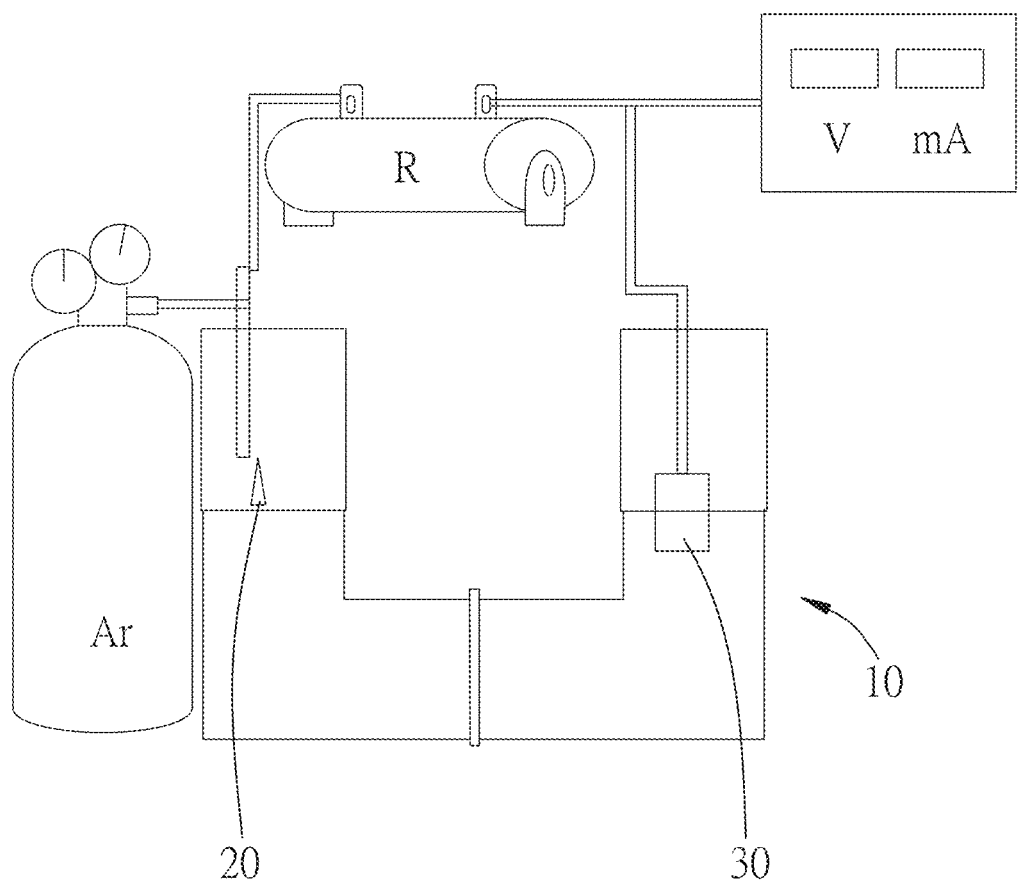
FIG. 3 is a schematic view of the first preferred embodiment of the invention further provided in combination with a membrane for proton exchange.

$Ag^+ + e_{aq}^- \rightarrow Ag^0 \rightarrow \text{small Ag cluster} \rightarrow \text{Ag nano particles}$ Referring to FIG. 3, the present invention could be further provided with a proton exchange membrane in the reaction liquid to achieve the same reaction process.

Referring to Table 2, using the method of Example 1, the present invention is applicable to the manufacture of other metal nanoparticles, with the ratio of the concentration of the reaction liquid to the added material shown in Table 2.

TABLE 2

| Zero-dimensional metal nanoparticle | Concentration of the precursor of the desired metal nanoparticles | substrate | electrolyte |
|---|---|---|---|
| silver | Silver nitrate for about 1 mM~0.01M | graphene | fructose, nitric acid |
| gold | Chloroauric acid for about 1 mM~0.01M | graphene | fructose, hydrochloric acid |
| copper | copper sulfate for about 1 mM~0.01M | graphene | fructose, nitric acid |
| platinum | chloroplatinic acid for 1 mM~0.01M | graphene | sodium chloride, hydrochloric acid |
| iron | ferric oxide for about 5~10 wt % | graphene | sodium chloride |
| iridium | iridium trichloride for about 1 mM~0.01M | graphene | citric acid |

Example 2

In the second preferred embodiment of the present invention, the electron receiving unit 30 could be an electrode for directly providing zero-dimensional nanoparticles, such as a silver electrode, a gold electrode, a copper electrode or a carbon rod. When the plasma generating device 10 provides a large amount of high-energy electrons in the reaction liquid, the electron receiving unit 30 released ions of the zero-dimensional nanoparticles to react with the electrons to generate the zero-dimensional nanoparticles by reduction. The system according to the present embodiment was applicable to manufacture of various metal nanoparticles and is further attached to a portion or an entire surface of the substrate to generate a diverse multiple-dimensional nano-composite.

As described in Example 1, the present embodiment was further provided with a proton-exchange membrane in the reaction liquid.

Referring to Table 3, the suitable materials added in the reaction liquid of Example 2 were listed.

TABLE 3

| Type of electron receiving unit | Type of substrate | Type of electrolyte |
|---|---|---|
| silver electrode | graphene | fructose, nitric acid |
| gold electrode | graphene | fructose, hydrochloric acid |
| copper electrode | graphene | fructose, nitric acid |

Figure 4:
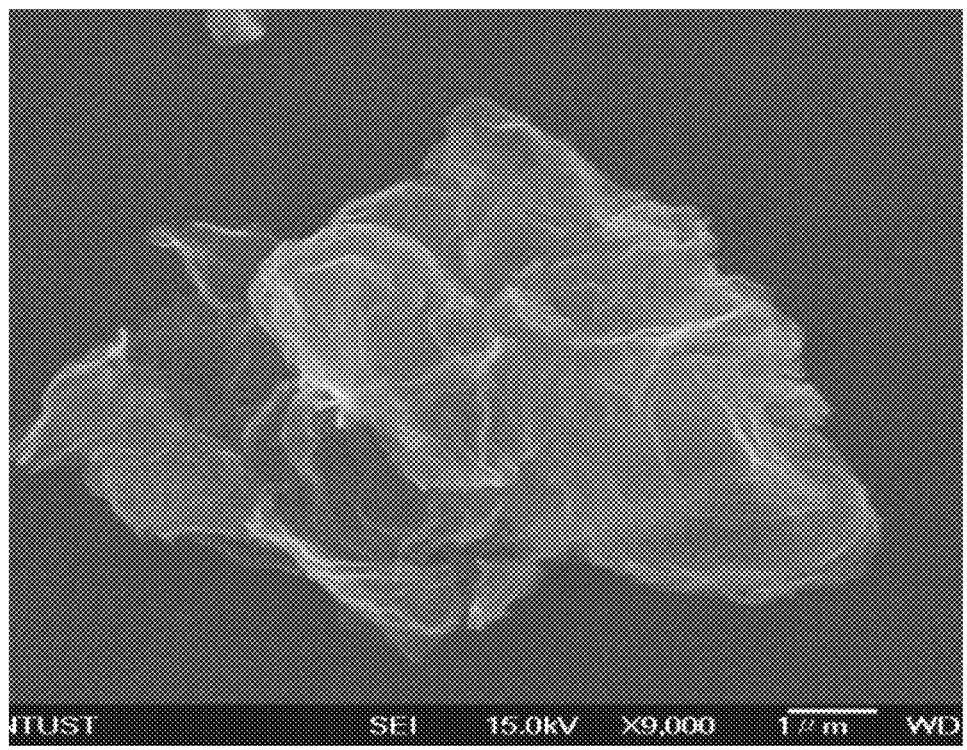
FIG. 4 is a SEM image of the surface of the graphene substrate before reaction.
Figure 5:
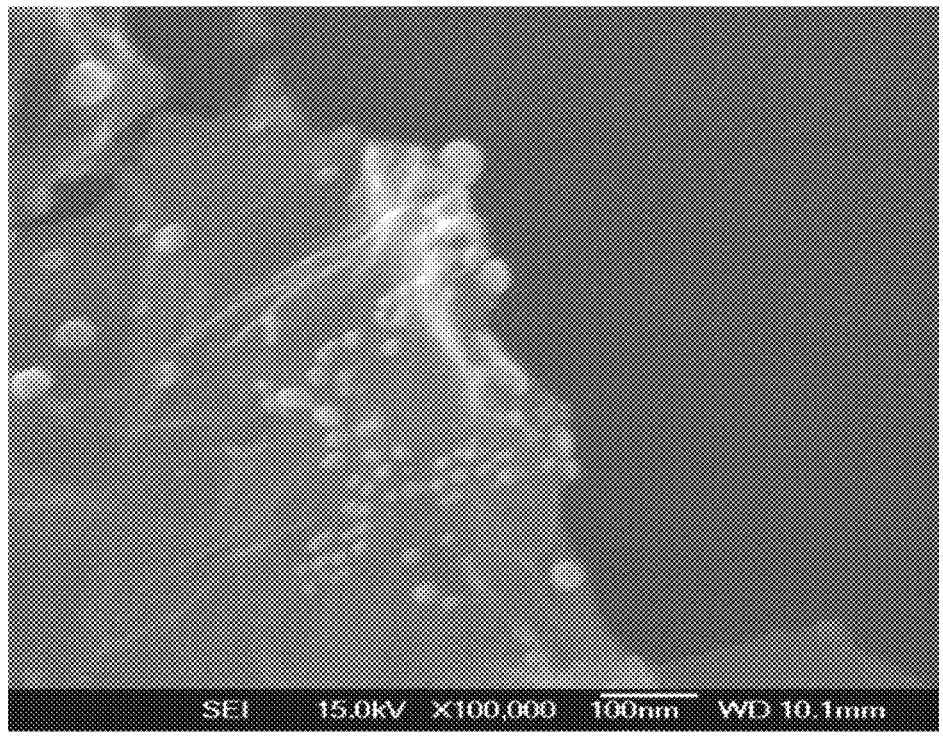
FIG. 5 is a SEM image of the first preferred embodiment of the present invention, which is obtained after reaction via the method according to the present invention.

Referring to FIG. 4 and FIG. 5, FIG. 4 demonstrated a SEM image of the surface of graphene substrate before reaction. FIG. 5 demonstrated a SEM image of the surface of graphene substrate according to the reaction method according the first preferred embodiment of the present invention. The surface of the substrate was attached with many silver nanoparticles, demonstrating the metal nanoparticles could be successfully attached to the surface of a graphene substrate.

Figure 12:
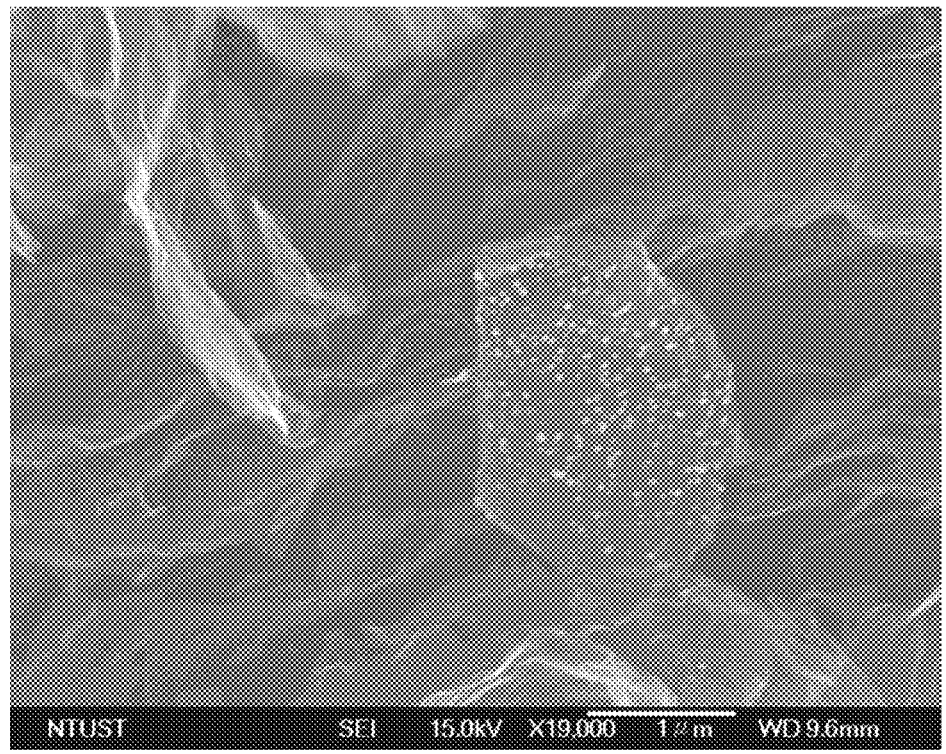
FIG. 12 is a SEM image of the nano gold particle composite according to the present invention.
Figure 13:
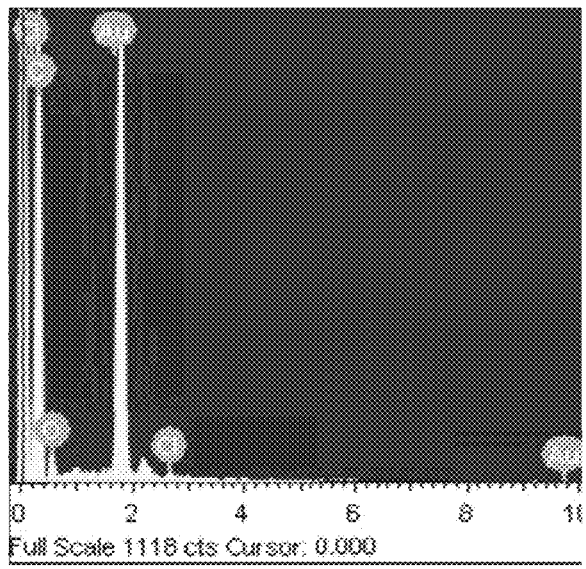
FIG. 13 a is an EDS diagram of the nano gold particle composite according to the present invention.

Referring to FIGS. 12 to 13, an electronic microscopy and EDS detection result show the growing gold nanoparticles on the surface of the substrate. As shown in FIG. 12, after the plasma treatment, the surface of the substrate form nanoparticles. With further elemental analysis by EDS, the formed nanoparticles on the surface of the substrate were made of gold. According to this result, the method according to the present invention is useful for effectively forming nanoparticles on various substrates, and nanoparticles are self-assembled on the substrate, generating the diverse multiple-dimensional nano-composite.

As the aforementioned Examples, the method according to the present invention can be very efficient to allow nanoparticles self-assembling on selected substrates. The resultant diverse multiple-dimensional nano-composite may have two different characteristics, may have diverse multiple-dimensional nanomaterials, and can generate novel and unique material properties. It was proven that, to form different combinations of metal or non-metallic materials of zero-dimensional nanomaterials and a substrate, the reaction liquid, the precursor and the substrate are selected to achieve the desired effect that cannot be reached by the prior art.

The metal and metal nano-composite could be a material for enhancing the enhance factor while measured by a Raman spectrum of the surface of the material. In general, the spontaneity of the Raman scattering is very weak, such that Raman spectroscopy measurement results are usually difficult to identify, leading to difficulties in measurement. The obtained nano-composite according to the present invention uniformly disperse on a substrate surface, such that when used with another material for analysis, the testing incident light can enhance the Raman spectroscopy of the analyte signal by metal nanoparticles/substrate to more clearly identify the test substance.

Figure 6:
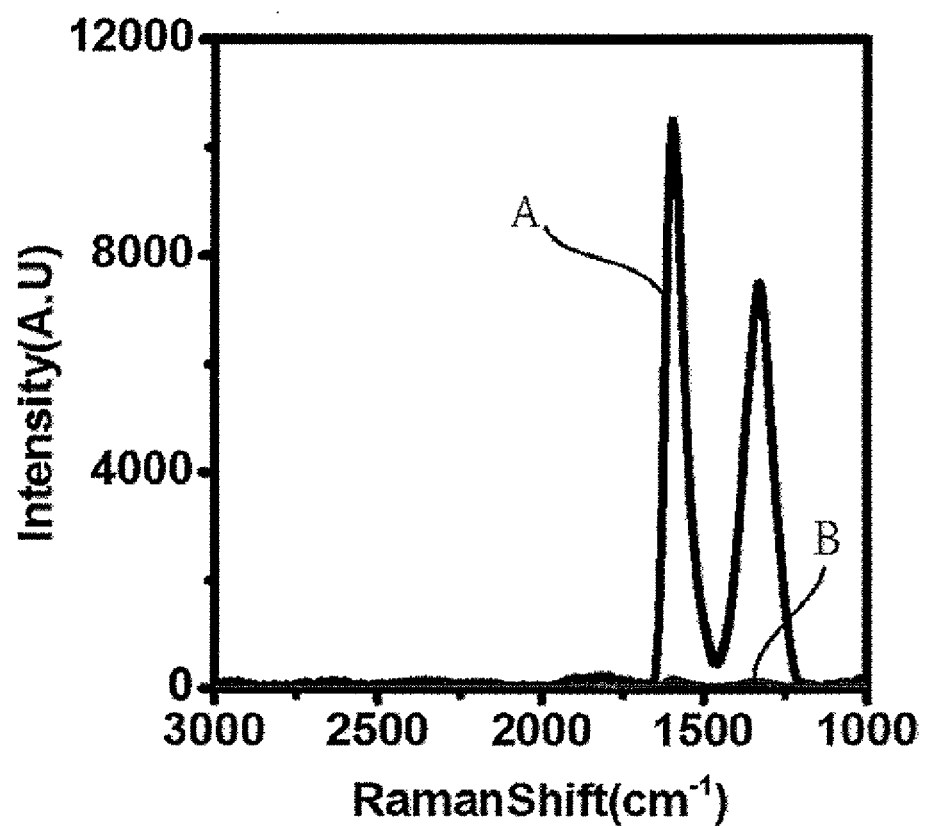
FIG. 6 is a diagram obtained from a Raman signal test of the first preferred embodiment of the present invention.

Referring to FIG. 6, A, which represents the nano-composite obtained from silver ions and graphene according to the first embodiment of the present invention, was enhanced by 70 times in Comparison to B, the Raman signal of the pure graphene. Therefore, in terms of application of the surface enhanced Raman spectroscopy (SERS), the present invention acquired a better surface enhanced Raman spectroscopy effect in comparison to the current technique directly mixing metal particles with graphene without complete association therebetween.

Figure 7:
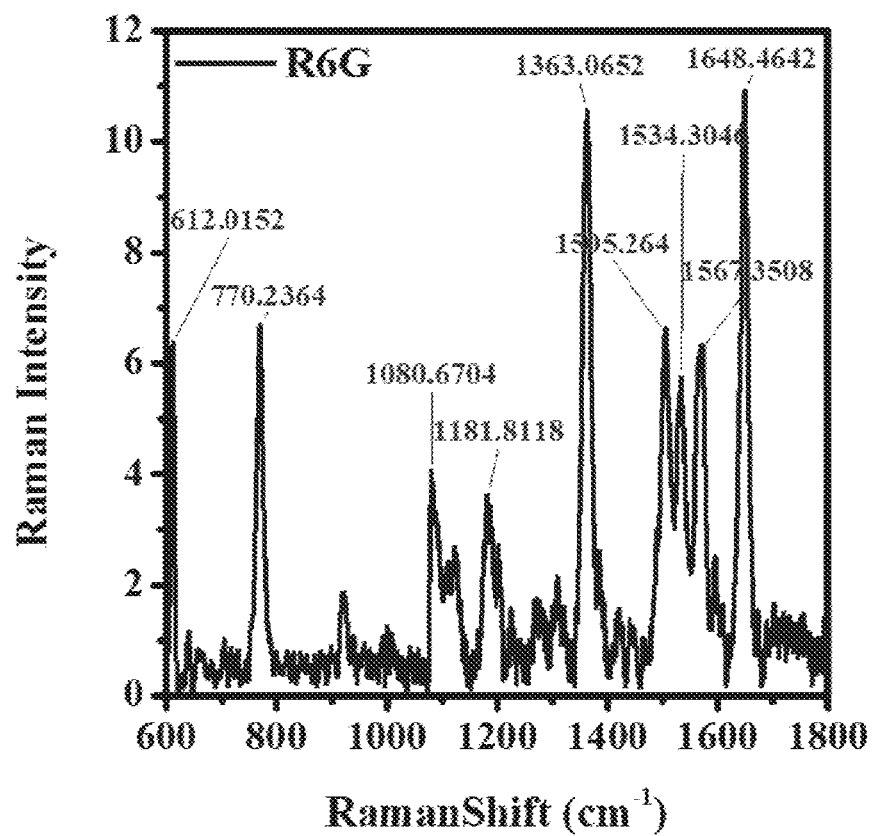
FIG. 7 is a diagram obtained from a Raman test of R6G raw material.
Figure 8:
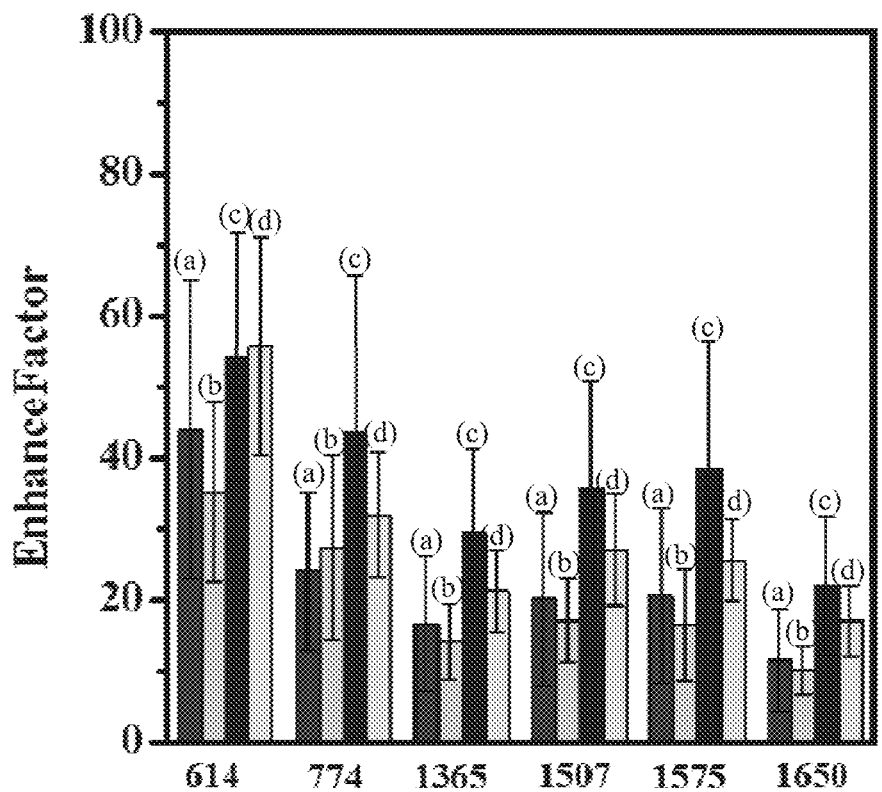
FIG. 8 illustrates a comparison of the results between the nano-silver graphene composite prepared by the first preferred embodiment of the method according to the present invention and R6G only.

Referring to FIGS. 7 to 8, FIG. 7 demonstrated a signal of Rhodamine 6G (R6G) in a Raman signal test, showing the intensity of the R6G feature peaks to be only around dozens. Comparing the silver and graphene nano-composite according to the first preferred embodiment of the present invention in FIG. 8 and the Raman signal of R6G in FIG. 7, panel (a) represented silver and graphene nano-composite prepared by Example 1 of the present invention by using a current of 4 mA, a reaction time of 20 minutes, panel (b) represented silver and graphene nano-composite prepared by Example 1 of the present invention by using a current of 5 mA, a reaction time of 20 minutes, panel (c) represented silver and graphene nano-composite prepared by Example 1 of the present invention by using a current of 6 mA, a reaction time of 20 minutes, and panel (d) represented silver and graphene nano-composite prepared by Example 1 of the present invention by using a current of 7 mA, a reaction time of 20 minutes. Comparing to the R6G test results, the Raman signal of the nanoparticles obtained by Example 1 of the present invention was enhanced to about 10 to 60 times.

Figure 9:
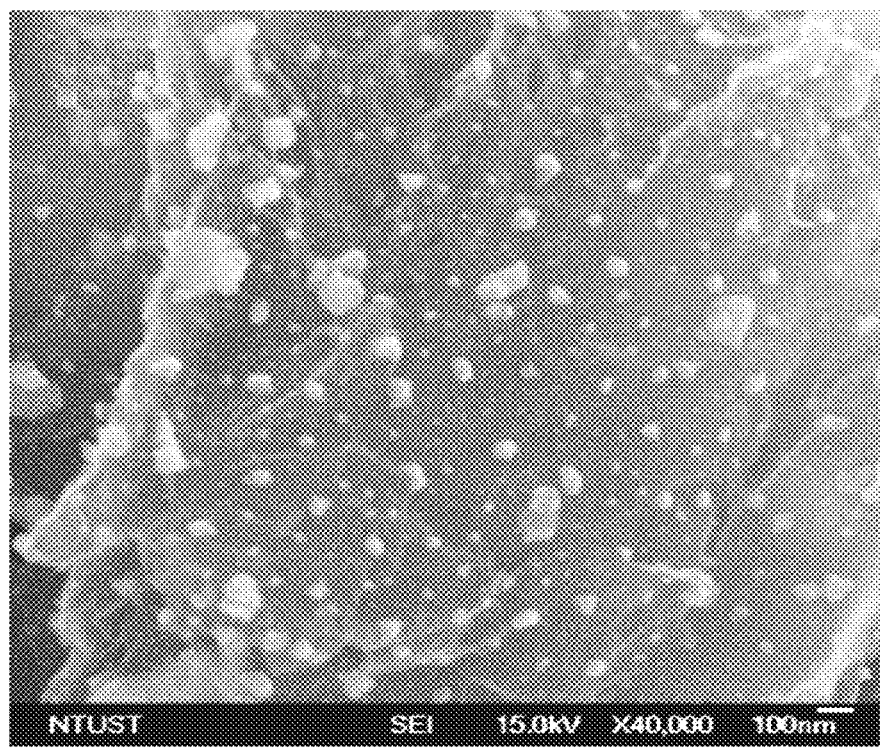
FIG. 9 is a SEM image of the surface of the graphene substrate obtained by the second preferred embodiment of the method according to the present invention.

Referring to FIGS. 4 and 9, FIG. 4 was a SEM image of the surface of the graphene substrate before reaction, and FIG. 9 was a SEM image of the surface of the graphene prepared by the second preferred embodiment of the method according to the present invention. Silver nanoparticles were attached to the graphene substrate, showing the success of the present invention to form metal nanoparticles on the surface of the graphene substrate.

Figure 10:
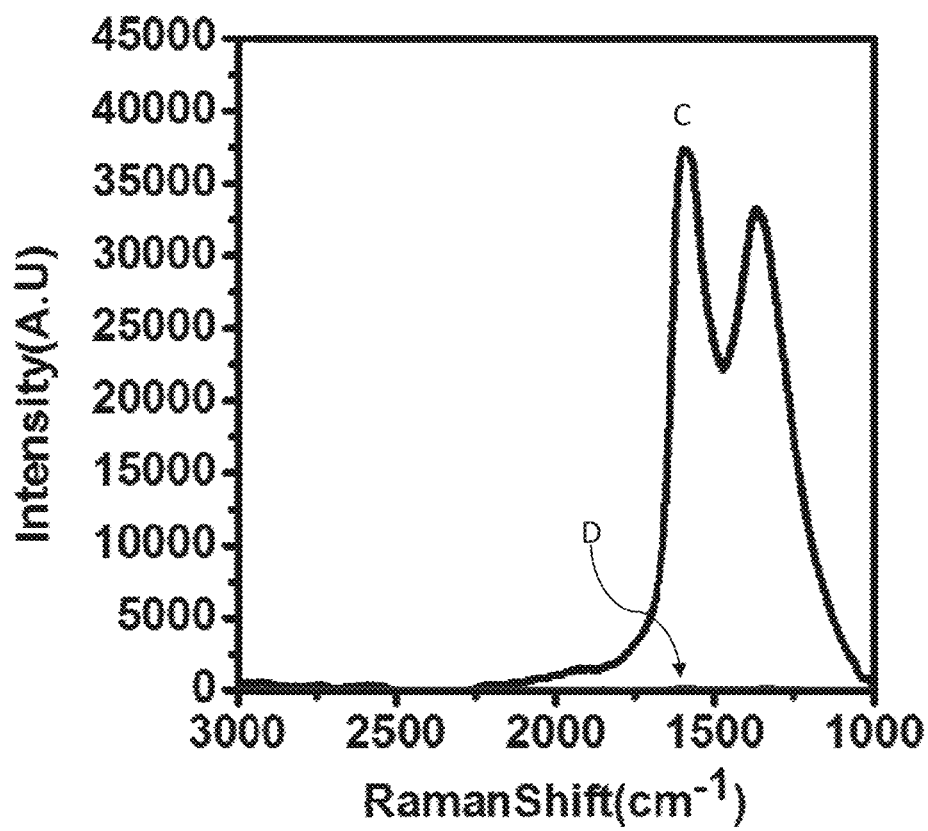
FIG. 10 illustrates a comparison of the results between the nano silver graphene composite prepared by the second preferred embodiment of the method according to the present invention and graphene only.
Figure 11:
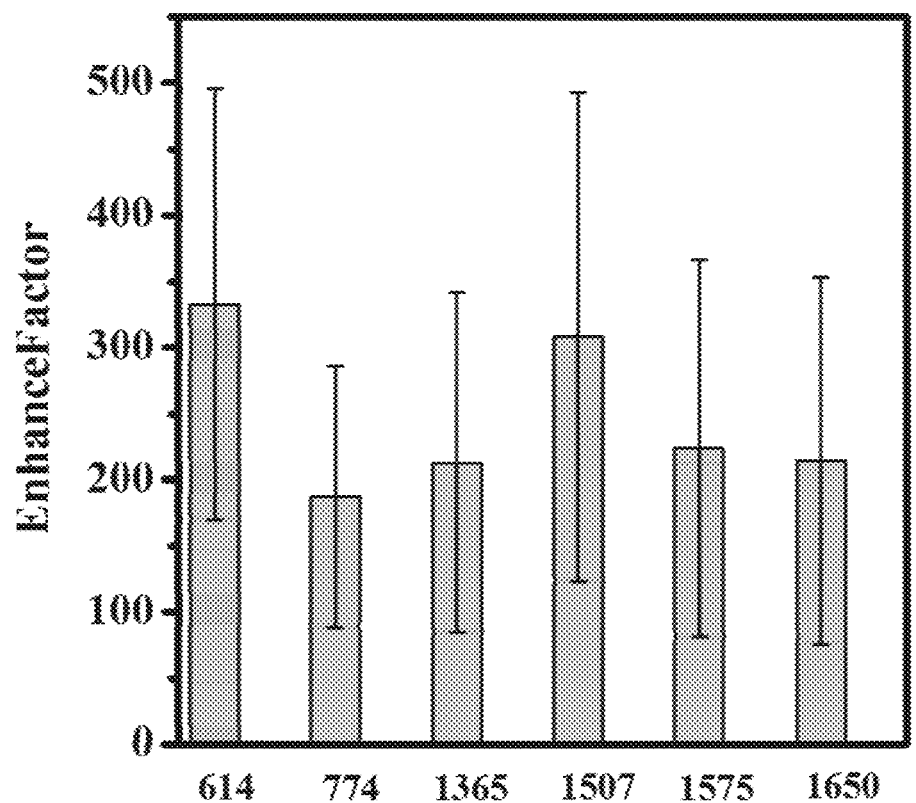
FIG. 11 illustrates a comparison of the results between the nano silver graphene composite prepared by the second preferred embodiment of the method according to the present invention and R6G only.

Referring to FIGS. 7, 10 to 11, C in FIG. 10 shows a Raman signal diagram of the silver and graphene nano-composite prepared by Example 2 of the present invention. Comparing to D, a test result of pure graphene material, the present invention could increase the Raman signal to about 200 times. Comparing the Raman signal test result of pure R6G in FIG. 7, a silver and graphene nano-composite prepared by Example 2 of the present invention is shown in FIG. 11, and the present invention further increased a Raman signal to about 100 to 400 times.

According to the above results, by using the reaction system as the second preferred embodiment of the present invention, the surface of the substrate was able to absorb more of the metal nanoparticles, leading to a resultant enhanced Raman scattering spectra effect higher than that of the first preferred embodiment of the invention. The main factor could be direct use of an electrode made of an element of the synthetic nanoparticles in the second preferred embodiment, comparing to the first preferred embodiment of the present invention. Therefore, in the second preferred embodiment of the present invention, the substrate can adsorb more nanoparticles on its surface.

According to the above description, the present invention has the following advantages:

1. the present invention provides a method for directly producing a large amount of nanoparticles with an even dispersion through the adjustment of formulation to generate nanoparticles directly synthesized or attached on a surface of a selected substrate, with nanoparticles being uniformly attached to the surface of the substrate, which results in an advanced method of producing a self-assembled nano-composite having a multiple-dimensional structure to solve the problem in industrial production of nanoparticles, and more to solve the problem in redundant procedures for dispersion of nanoparticles or nano-composites;

2. the present invention provides a solution for resolving the need of nanomaterials for different purposes, by choosing desired nanoparticles and substrates to obtain various diverse multiple-dimensional nano-composites, which result from precise choice of materials to grow to concur the barrier of current techniques to provide a more diverse, less restrictive, more simple and efficient method for producing the same;

3. the present invention utilizes a plasma manufacturing process to increase the absorption effect between the metal nanoparticles and the substrate, which is completely different from the existing particle/substrate synthesis;

4. in the aspect of applications, the present invention provides a substance comprising metal nanoparticles with an enhanced Raman spectroscopy, which makes it ideally suitable for an enhanced surface Raman spectroscopy (SERS) effect for use in related applications, with the resulting nano-composite, compared to pure nanoparticles, more obviously and hugely increasing the effect than that of the prior art;

5. the present invention utilizes a plasma process to disperse large amounts of metal particles uniformly in the solution or on the surface of the substrate, and when proven by the analysis of the effect on the present invention, the present invention is better than existing materials when applied to the surface enhanced Raman spectroscopy;

6. the present invention can be effectively applied to the material characteristics detection, biomedical industry, food safety and environmental pollution monitoring and prevention, and other purposes; and 7. the present invention provides nanoparticles without adding additional surfactant to achieve uniform dispersion of nanoparticles, which solves the problems in the art that require using an organic solvent, to rendering the process environmentally friendly.

What is claimed is:

1. A method comprising:
    providing a reaction solution containing at least one dimensional nanomaterials and a precursor of zero-dimensional nanoparticles;
    applying plasma to a surface of the reaction solution or in the reaction solution to generate the zero-dimensional nanoparticles from the precursor to assemble on the at least one dimensional nanomaterials, wherein the plasma is atmospheric plasma or microplasma; wherein the zero-dimensional nanoparticles are silver nanoparticles, gold nanoparticles, platinum nanoparticles, or iridium nanoparticles; wherein the at least one dimensional nanomaterials comprise nanoparticles of graphene, functionalized graphene or molybdenum disulfide, graphene nanoribbon, or carbon nanotubes; and
    self-assembling the zero-dimensional nanoparticles on the surface of the at least one dimensional nanomaterials in the reaction solution to form a nano-composite dispersed in the reaction solution.

2. The method according to claim 1, wherein the at least one dimensional nanomaterials contain nanotubes, nanowires, nanoribbon, or nano-platelets.

3. The method according to claim 2, wherein the reaction solution further contains silver nitrate, chloroauric acid, chloroplatinic acid, or iridium trichloride.

4. The method according to claim 1, wherein the reaction solution further contains silver nitrate, chloroauric acid, chloroplatinic acid, or iridium trichloride.

* * * * *